BROADBAND MULTILEVEL PHASE MODULATION SYSTEM EMPLOYING
DIGITALLY CONTROLLED SIGNAL REFLECTION MEANS
Filed July 18, 1967
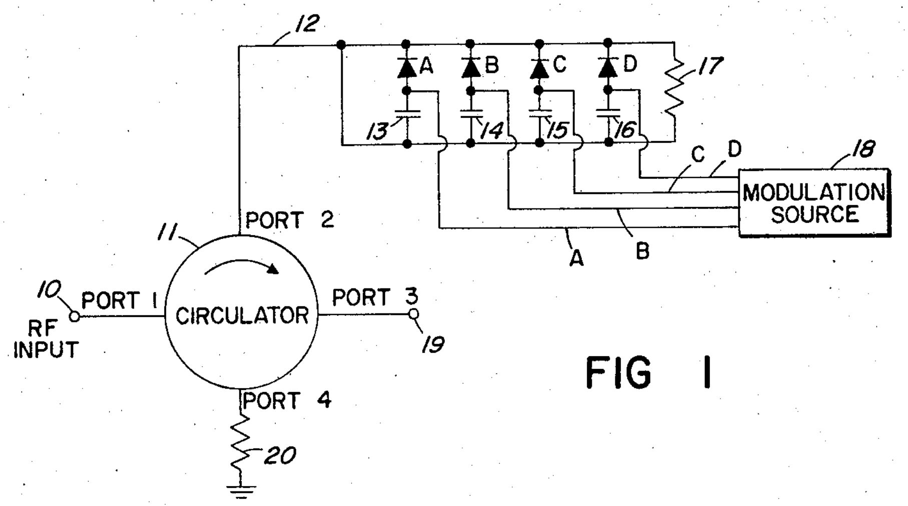
FIG 1
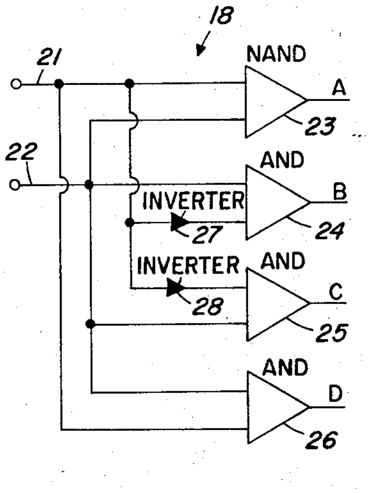
FIG 2
| INPUTS | | OUTPUTS | | | |
|---|---|---|---|---|---|
| 21 | 22 | A | B | C | D |
| 0 | 0 | 1 | 0 | 0 | 0 |
| 0 | 1 | 0 | 1 | 0 | 0 |
| 1 | 0 | 0 | 0 | 1 | 0 |
| 1 | 1 | 0 | 0 | 0 | 1 |
FIG 3
INVENTOR.
NOEL A. GANTICK
BY Moody & Hallacher
ATTORNEYS United States Patent Office 3,506,930

Patented Apr. 14, 1970

3,506,930

BROADBAND MULTILEVEL PHASE MODULATION SYSTEM EMPLOYING DIGITALLY CONTROLLED SIGNAL REFLECTION MEANS

Noel A. Gantick, Plano, Tex., assignor to Collins Radio Company, Cedar Rapids, Iowa, a corporation of Iowa Filed July 18, 1967, Ser. No. 654,138

Int. Cl. H03c *3/00;* H03k *19/20*

U.S. Cl. 332—16 6 Claims

ABSTRACT OF THE DISCLOSURE

Disclosed is a phase modulator which changes the phase of an incoming signal by multiples of a preselected phase angle. The signal is injected into the first port of a circulator and passed out of the second port to a coaxial line having a plurality of parallel connected diodes thereacross. A modulation source biases one of the diodes, depending upon the input of the modulator. The conductive diode shorts the coaxial cable to provide the desired phase shift of the signal. The shifted signal reenters the circulator at port 2 and exits at port 3 as a phase modulated signal.

This invention relates generally to phase modulators and particularly to a quadrature phase modulator in which the phase of an RF signal can be shifted in preselected angular intervals.

There are many varied uses in the art for phase modulators. Many of these uses require a phase shift of the input frequency by preselected phase increments. Because the phase shift required must vary rapidly it is necessary to provide a system in which the phase shifting network is switched rapidly and positively in a minimum amount of time. It is sometimes necessary to shift the phase by various multiples of a preselected phase increment. The invention is directed toward a system for accomplishing this requirement. The invention as described has no frequency sensitive elements and therefore can be used over a very wide range of frequencies. The invention is therefore not confined to use with radio frequencies.

It is therefore an object of this invention to provide a phase modulator in which the RF input is shifted in preselected degree intervals.

It is another object to provide such a modulator in which the phase of the RF input is shifted in various multiples of a preselected angular increment.

It is another object to provide such a modulator in which the phase shift is provided by a coaxial cable and a plurality of properly positioned diodes across said cable.

It is another object to provide such a modulator in which the degree of phase shift is varied by use of an input source requiring only two different voltage outputs.

It is another object to provide such a device in which the desired modulation can be provided by a source obeying a binary code providing only two output voltages which have potentials defined as zeros and ones.

Further objects, features, and advantages of the invention will become apparent from the following description and claims when read in view of the accompanying drawings wherein like numbers indicate like parts and in which:

FIGURE 1 shows a preferred embodiment of the invention;

FIGURE 2 shows one embodiment of the modulation source useful with the inventive circuit; and FIGURE 3 shows outputs of the modulator for various inputs.

FIGURE 1 shows an input terminal 10 which receives an RF input which is to be modulated. The RF signal is passed from terminal 10 to a circulator 11 containing four ports 1, 2, 3, and 4. A coaxial cable 12 is connected to port 2. A plurality of equally spaced diodes A, B, C and D are connected across the conductive elements of coaxial cable 12. Connected in series with diodes A, B, C and D are a series of capacitors 13, 14, 15 and 16 respectively. Capacitors 13 through 16 provide DC isolation to the diodes and also prevent misfiring of the diodes. A resistive element 17 is used as a termination on the coaxial line. A modulation source 18 having four outputs identified as A, B, C and D is connected between the junctions of the diodes and capacitors as shown in FIGURE 1. An output terminal 19 is connected to port 3 of circulator 11 to receive the modulated RF output. Port 4 is grounded through resistor 20, reasons for which will be explained hereinafter.

In operation an RF input is applied to terminal 10 of circulator 11. The RF is routed by circulator 11 to port 2 from which it enters coaxial line 12. Depending upon which diode is gated on by modulator 18 the RF signal is shorted by the conductive diode and is then reflected back into port 2 of circulator 11 from which it travels to port 3 to output terminal 19. The ports of circulator 11 are therefore bilateral in that a signal can enter or exit the circulator through the same port. Output terminal 19 would ordinarily be terminated by an RF load. This is well known in the art and therefore is not shown here. Port 4 is provided to terminate the mismatched reflections of port 3 and thereby isolate the RF input from the RF output.

The modulation of the RF wave can be quadrative by spacing the diodes one-eighth of a wavelength apart $\lambda/8$. The wavelength $\lambda$ is determined by the frequency of the RF input. With this spacing the RF signal is delayed 45° into the coaxial cable and 45° out of the cable by each diode and therefore each diode effects a 90° shift of the RF signal. Consequently when diode A is gated on the phase shift will be 90°. When diode C is gated on the phase shift will be 270°. The particular spacing of diodes chosen therefore results in a quadrature modulation of the RF signal. It should be noted that the number of diodes used and the spacing of said diodes can be changed to thereby change the incremental angle of the phase shift and the number of shifts of the RF signal within the scope of the inventive concept.

The diodes are poled such that a signal present on either of the output lines A, B, C or D of modulataion source 18 will render one of the diodes conductive. When the diode is in this state the RF signal will be shorted through the diode back into circulator 19. It is therefore necessary to provide a modulation source 18 which provides a pulse on only one of the four output lines A, B, C or D at a given instant. Such a modulation source is shown in FIGURE 2. The modulator of FIGURE 2 is designed with two input leads 21 and 22 and four output leads A, B, C and D which correspond to the identically identified leads shown in FIGURE 1. The inputs required on leads 21 and 22 in order to properly bias diodes A, B, C and D are shown in FIGURE 3. It should be noted from viewing FIGURE 3 that only one output lead contains a pulse at a given time and therefore only one of diodes A, B, C or D will be conductive at a given instant. The modulation angle can therefore be changed by switching the input to either or both of input leads 21 or 22. The inputs are either a "zero," no input on the line, or a "one" which is any convenient voltage. Although the output voltages of modulator 18 are called pulses they can be continuous voltages which exist as long as the proper inputs exist. The phase modulation of the RF signal will therefore be controlled by the inputs to modulator 18.

The modulation circuit 18 consists of a NAND gate 23 which provides the output for lead A and three AND gates 24, 25, and 26 which respectively provide the outputs for leads B, C, and D. The two input leads 21 and 22 are each connected to an input of the logic circuits. However, connected between one input of AND 24 and input terminal 21 is an inverter 27. Another inverter 28 is connected between one of the inputs of AND 25 and input terminal 22. Because the modulator 18 has only two input terminals only a single voltage source is required. The switching to the input leads 21 and 22 can then be effected by a mechanical switching arrangement. For example, a rotor switch can be used. Alternatively a binary input can be used and therefore the system is useful with digital circuitry. The exact manner of providing the required inputs to the modulator 18 is within the purview of one skilled in the art and therefore further details will not be presented here.

Although this invention has been described with respect to a particular embodiment thereof, it is not to be so limited as changes and modifications may be made therein which are within the spirit and scope of the invention.

I claim:

1. A broadband phase modulation system comprising: input circuit means having a first, a second, and a third terminal; said first terminal serving as an input terminal for receiving an input signal; transmission line phase shifting means connected to said second terminal; said transmission line phase shifting means having a plurality of voltage sensitive means for selectively shorting said transmission line at preselected lengths corresponding to fractions of wavelength of an input signal thereby reflecting the received wave with a phase variation; said second terminal also serving as an input terminal for injecting said reflected phase shifted signals into said input circuit means; said third terminal serving as output terminal for said phase shifted signal; and modulation means for selectively applying a biasing voltage to said voltage sensitive means.

2. The system of claim 1 wherein said voltage sensitive means are a plurality of diodes equally spaced along said transmission line.

3. The system of claim 2 wherein said transmission line is a coaxial cable.

4. The system of claim 3 wherein there are four diodes arranged in a parallel relationship, said diodes being similarly poled with respect to said coaxial cable, and said input circuit means is a circulator.

5. The system of claim 1 wherein said modulation means comprises: a first and a second input, a NAND gate, two inverters, and three AND gates, said NAND gate and one of said AND gates receiving said first and second inputs, each of the other two AND gates receiving said first input through an inverter and said second input, and each of said gates providing one output.

6. The system of claim 4 wherein said modulation means comprises: a first and a second input, a NAND gate, two inverters, and three AND gates, said NAND gate and one of said AND gates receiving said first and second inputs, each of the other two AND gates receiving said first input through an inverter and said second input, and each of said gates providing one output.

References Cited

UNITED STATES PATENTS

| | | | |
|---|---|---|---|
| 3,136,950 | 6/1964 | Mackey | 333—1.1 X |
| 3,149,292 | 9/1964 | Gamble et al. | 332—23 X |
| 3,195,051 | 7/1965 | Chang | 333—1.1 X |
| 3,353,031 | 11/1967 | Abel | 330—4.9 X |
| 3,386,052 | 5/1968 | Thomas | 332—29 X |
| 3,154,744 | 10/1964 | Maley | 307—207 X |

ALFRED L. BRODY, Primary Examiner

U.S. Cl. X.R.

307—207; 325—145, 445; 328—92; 332—23, 18; 333—1.1, 24.1